United States Patent
Dutta et al.

(10) Patent No.: US 7,162,526 B2
(45) Date of Patent: Jan. 9, 2007

(54) APPARATUS AND METHODS FOR FILTERING CONTENT BASED ON ACCESSIBILITY TO A USER

(75) Inventors: Rabindranath Dutta, Austin, TX (US); Robert J. Kamper, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1069 days.

(21) Appl. No.: 09/773,189

(22) Filed: Jan. 31, 2001

(65) Prior Publication Data

US 2002/0103914 A1    Aug. 1, 2002

(51) Int. Cl.
G06F 15/16    (2006.01)
(52) U.S. Cl. ............... 709/229; 709/217; 709/218; 704/270; 715/517
(58) Field of Classification Search ............ 709/203, 709/217, 218, 225, 229; 332/100, 114; 715/517, 715/523; 704/270, 271
See application file for complete search history.

(56) References Cited

U.S. PATENT DOCUMENTS

| | | | | |
|---|---|---|---|---|
| 5,983,247 | A * | 11/1999 | Yamanaka et al. | 715/526 |
| 6,029,182 | A * | 2/2000 | Nehab et al. | 715/523 |
| 6,122,648 | A * | 9/2000 | Roderick | 715/513 |
| 6,272,492 | B1* | 8/2001 | Kay | 707/10 |
| 6,324,511 | B1* | 11/2001 | Kiraly et al. | 704/260 |
| 6,457,030 | B1* | 9/2002 | Adams et al. | 715/523 |
| 6,476,833 | B1* | 11/2002 | Moshfeghi | 345/854 |
| 6,665,642 | B1* | 12/2003 | Kanevsky et al. | 704/260 |
| 6,675,212 | B1* | 1/2004 | Greenwood | 709/224 |
| 6,684,370 | B1* | 1/2004 | Sikorsky et al. | 715/513 |
| 6,714,963 | B1* | 3/2004 | Levine et al. | 709/203 |
| 6,725,424 | B1* | 4/2004 | Schwerdtfeger et al. | 715/513 |

FOREIGN PATENT DOCUMENTS

| | | |
|---|---|---|
| JP | 09009244 | 1/1997 |
| JP | 11272574 | 10/1999 |
| JP | 2000-348040 | 12/2000 |
| JP | 2000357176 | 12/2000 |

OTHER PUBLICATIONS

Rowan et al., "Evaluating Web Resources for Disability Access" Nov. 13-15, 2000, Assets'00, pp. 80-84.*
Kennel et al., "WAB: World Wide Web access for blind and visually impaired computer users" Jun. 1996, SIGCAPH Newsletter, No. 55, pp. 10-15.*

* cited by examiner

Primary Examiner—Ario Etienne
Assistant Examiner—Avi Gold
(74) Attorney, Agent, or Firm—Duke W. Yee; Marilyn Smith Dawkins; Wayne P. Bailey

(57) ABSTRACT

Apparatus and methods for filtering content based on the accessibility of the content to a user are provided. The apparatus and methods make use of an evaluation tool that evaluates requested content for accessibility to users having special needs, such as handicapped or disabled users. The results of the evaluation are then compared to a user's designation of a required accessibility level to determine if the content is accessible to the user. If the results of the evaluation indicate that the content meets the user's required accessibility level, the content is provided to the user. If the evaluation indicates that the content does not meet the user's required accessibility level, the content is not provided to the user or a not accessible indicator is appended to the content. In a further embodiment, the content may be modified to make the content accessible to the user.

34 Claims, 4 Drawing Sheets

APPARATUS AND METHODS FOR FILTERING CONTENT BASED ON ACCESSIBILITY TO A USER

TECHNICAL FIELD

The present invention is directed to an improved computer system. More particularly, the present invention provides apparatus and methods for filtering content based on accessibility to a user.

DESCRIPTION OF RELATED ART

Recently there has been increased emphasis on designing Internet Web pages and content such that the content is accessible to persons having special needs, such as those having a handicap or disability. While there is an increased emphasis on the need to make content accessible, the reality is that much of the content still available over the Internet is not accessible to persons having special needs.

In an effort to identify Web content that is and is not accessible to persons having special needs, the Center for Applied Special Technology (CAST) has developed a software application entitled Bobby™. The Bobby™ software may be used to evaluate a Web page to determine if the Web page meets criteria that are based on accessibility guidelines promulgated by the World Wide Web Consortium. If Bobby™ determines that a Web page meets the accessibility criteria, the Web page administrator is permitted to add a Bobby approved icon to the Web page to indicate to handicapped or disabled persons that the Web page is accessible to them.

While Bobby™ provides a mechanism for evaluating Web pages, a user is not aware of whether a Web page is Bobby approved until after the user retrieves the Web page. In fact, Bobby™ approved Web pages are a minority when taking into consideration all of the Web pages accessible via the Internet. Thus, since a user is not able to determine a priori that a Web site is handicapped accessible, i.e. Bobby™ approved, it is much more likely that a user will retrieve a Web page that is not handicapped accessible.

Moreover, if a handicapped person wishes to perform a search of Internet Web pages for a particular subject of interest, the results of the search will contain a majority of, if not all, handicapped inaccessible Web sites and only a minority of handicapped accessible Web determine which of the Web sites returned in the search results are handicapped accessible. Therefore, it would be beneficial to have apparatus and methods for filtering content based on whether or not the content is accessible to persons having special needs.

SUMMARY OF THE INVENTION

The present invention provides apparatus and methods for filtering content based on the accessibility of the content to a user. The apparatus and method make use of an evaluation tool that evaluates requested content for accessibility to users having special needs, such as handicapped or disabled users. The results of the evaluation are then compared to a user's designation of a required accessibility level to determine if the content is accessible to the user. If the results of the evaluation indicate that the content meets the user's required accessibility level, the content is provided to the user. If the evaluation indicates that the content does not meet the user's required accessibility level, the content is not provided to the user or a not accessible indicator is appended to the content. In a further embodiment, the content may be modified to make the content accessible to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
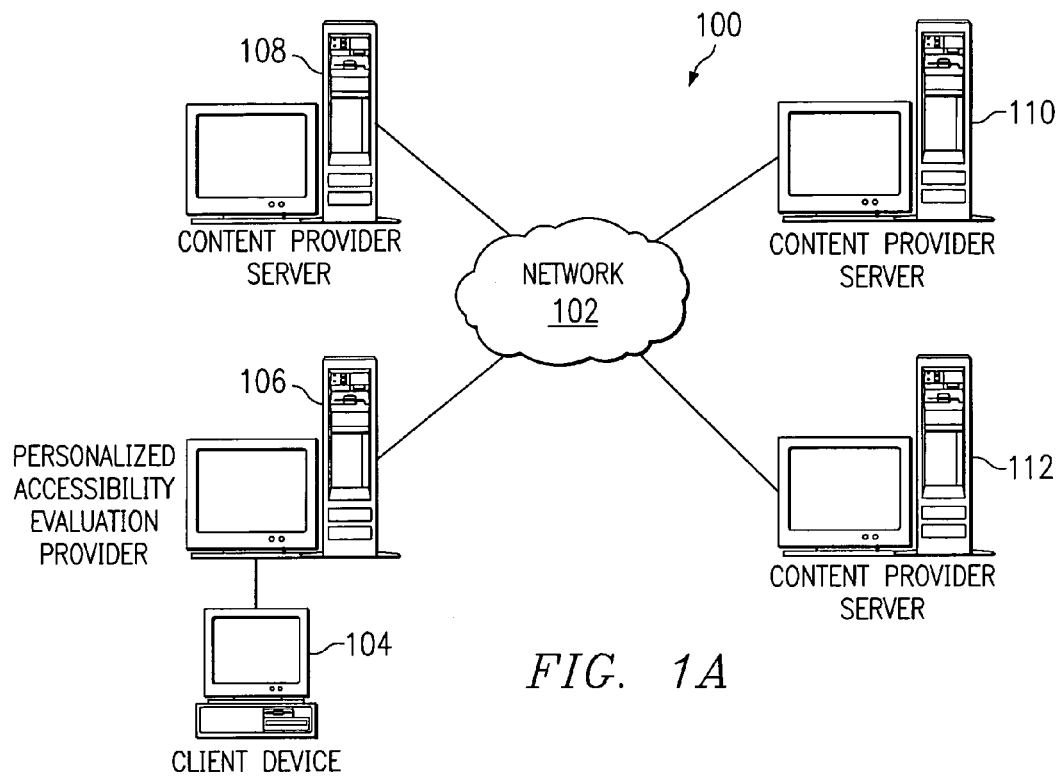
FIG. 1A is an exemplary block diagram illustrating a network data processing system according to one embodiment of the present invention.

With reference now to the figures, FIG. 1A depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, content provider servers 108–112 are connected to network 102 along with personalized accessibility evaluation provider 106. In addition, client device 104 is also connected to network 102. The client device 104 may be, for example, a personal computer, network computer, personal digital assistant, portable computing device, or the like. In the depicted example, content provider servers 108–112 provide data, such as files, web pages, operating system images, and applications to client device 104. Client device 104 is a client to content provider servers 108–112. Network data processing system 100 may include additional servers, clients, service providers and other devices not shown.

In the depicted example, network data processing system 100 is the Internet with network 102 representing a world-wide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1A is intended as an example, and not as an architectural limitation for the present invention.

The personalized accessibility evaluation provider 106, as will be described in more detail hereafter, provides a filtering mechanism by which content received from content provider servers 108–112 is checked for objectionable content before being forwarded to client device 104. The personalized accessibility evaluation provider 106 may be implemented, for example, on a proxy server to which the client device 104 is logged on (as shown), may be implemented as an application on the client device 104, or as a network-resident service implemented by a proxy that resides on a service provider's premises through which content provider servers 108–112 are accessed, or the like.

Figure 1B:
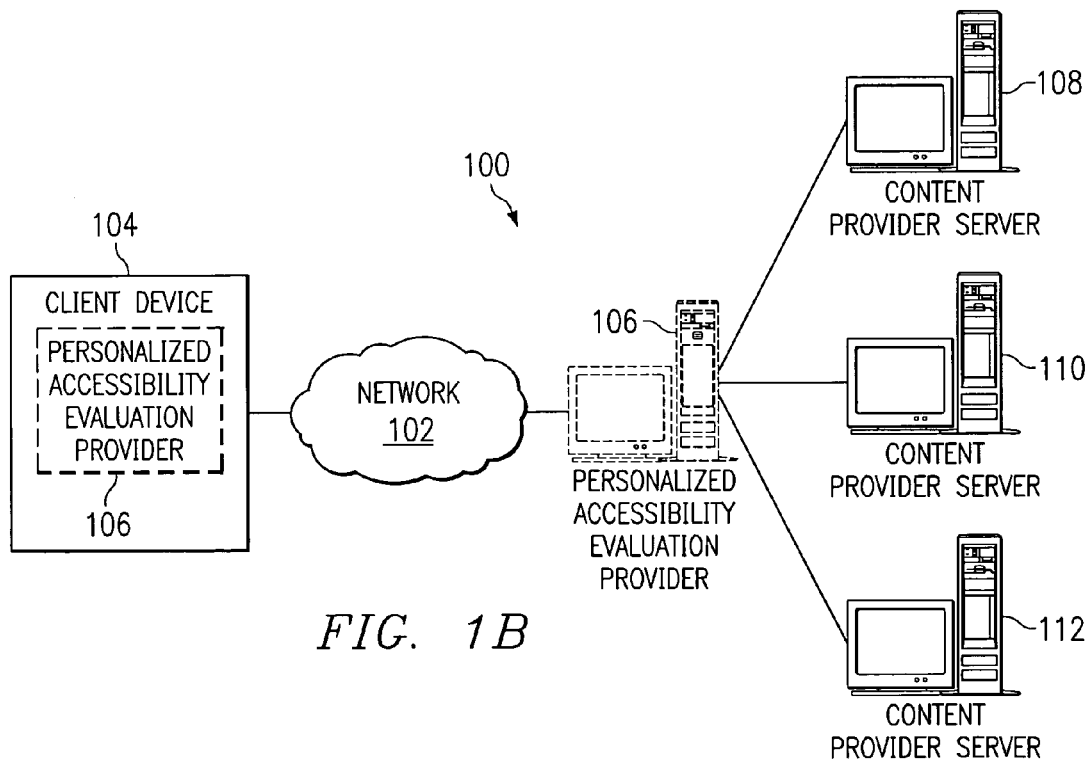
FIG. 1B is an exemplary block diagram illustrating a network data processing system according to two other alternative embodiments of the present invention.

In the case of the personalized accessibility evaluation provider 106 being implemented on the client device 104, the personalized accessibility evaluation provider 106 may be a stand alone software application, a portion of a web browser application, a plug-in to a web browser application, or the like. For purposes of illustration, it will be assumed in the following description that personalized accessibility evaluation provider 106 is implemented on a proxy server. The proxy server is present between the client device and the content provider server, and may either be a proxy server accessed by the client device or may be a reverse proxy of a content provider through which access to the content provider servers 108–112 is obtained, as shown in FIG. 1B.

Proxy servers are generally known in the art and are available for common Internet services. For example, an HTTP proxy is used for Web access, and an SMTP proxy is used for e-mail. Proxy servers generally employ network address translation (NAT), which presents one organization-wide IP address to the Internet. The proxy server funnels all user requests to the Internet and fans responses back out to the appropriate users. Proxies may also cache Web pages, so that the next request can be obtained locally.

Figure 2:
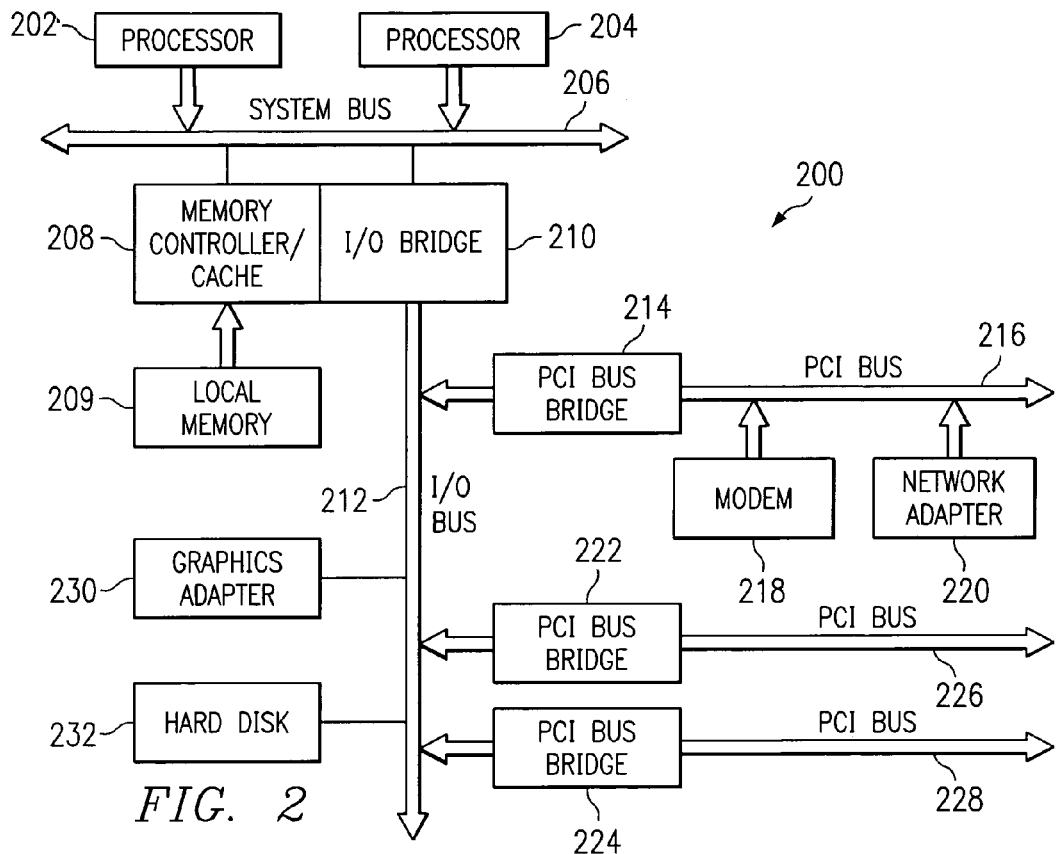
FIG. 2 is an exemplary block diagram illustrating a server device according to one embodiment of the present invention.

Referring to FIG. 2, a block diagram of a data processing system that may be implemented as a server, such as content provider server 108–112 or a proxy server on which the personalized accessibility evaluation provider 106 may be resident, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIGS. 1A and 1B may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
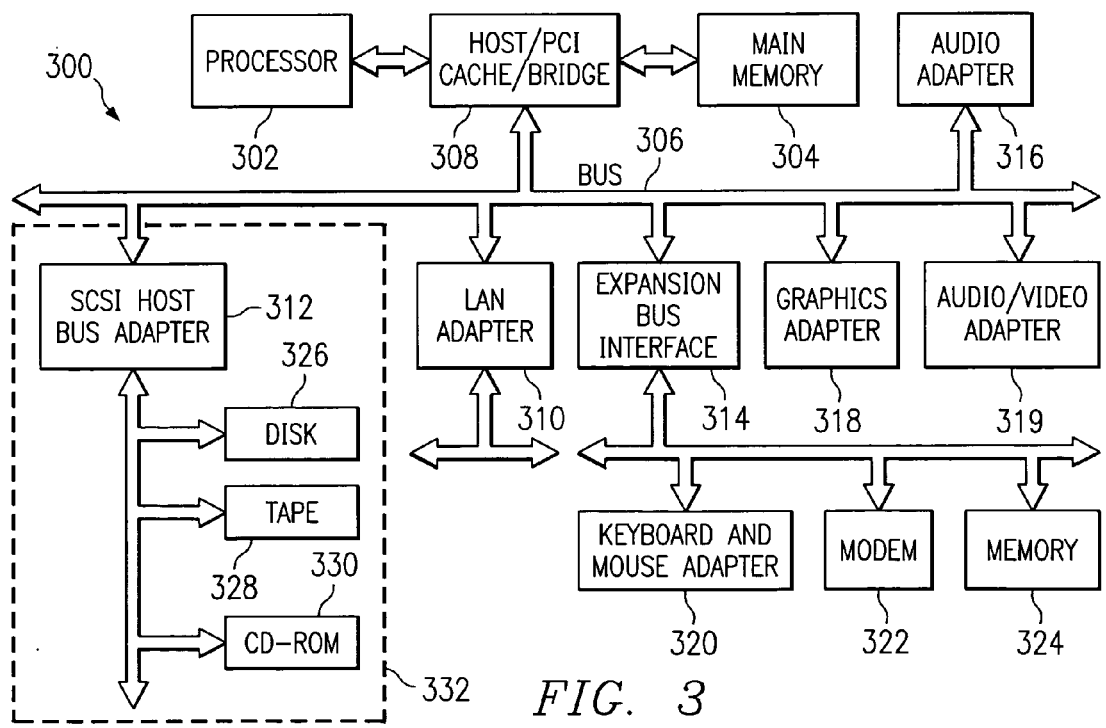
FIG. 3 is an exemplary block diagram illustrating a client device according to one embodiment of the present invention.

With reference now to FIG. 3, a block diagram illustrating a data processing system is depicted in which the present invention may be implemented. Data processing system 300 is an example of a client computer, such as client device 104 in FIGS. 1A and 1B. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
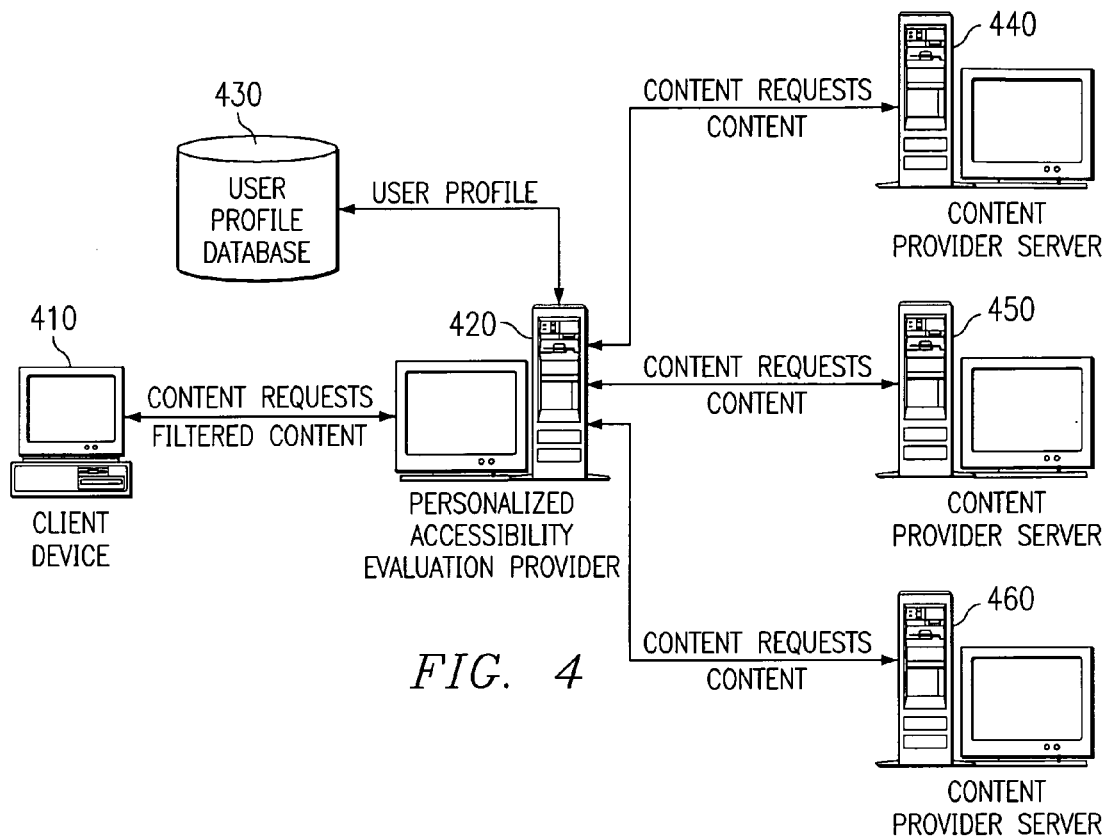
FIG. 4 is an exemplary block diagram illustrating data flow according to one embodiment of the present invention.

FIG. 4 is an exemplary block diagram illustrating the data flow according to the present invention. As shown in FIG. 4, the client device 410 sends content requests to the personalized accessibility evaluation provider 420 and receives filtered content from the personalized accessibility evaluation provider 420. The term "content" as it is used in the present description is intended to mean any electronic information that is retrievable and able to be provided to a client device. Thus, "content" may be Web pages, including Web pages generated using Hypertext Markup Language (HTML), Wireless Markup Language (WML), and the like, applications, images, and the like. In the following exemplary embodiments, "content" will be assumed to be HTML Web pages. The term "filtered content" as it is used herein, is intended to mean content that has been evaluated for accessibility and compared to user designated accessibility requirements.

The personalized accessibility evaluation provider 420 forwards content requests from the client device 410 to the content provider servers 440–460 and receives requested content from the content provider servers 440–460. The personalized accessibility evaluation provider 420 further retrieves user profile information from user profile database 430 for use in filtering the requested content received from the content provider servers 440–460, as described hereafter.

With the present invention, the client device 410 issues requests for content to one or more of content provider servers 440–460 in a manner generally known in the art. For example, a user of client device 410 may enter a Uniform Resource Locator (URL) associated with a Web page resident on content provider server 440 into a web browser application on the client device 410. The entry of the URL into the web browser application causes the Web browser application to transmit a request for the Web page associated with the URL via a communication link to the personalized accessibility evaluation provider 420. The content request from the client device 410 is routed through the personalized accessibility evaluation provider 420 which acts as a proxy server for the client device 410.

Alternatively, the client device 410 may enter a search request using a search engine, such as those provided by Yahoo™ or HotBot™. The search engine may be resident on the personalized accessibility evaluation provider 420 and may search content providers that have been registered with or tracked by the search engine. Searching the content providers may include, for example, searching a locally stored version of the content provider web page, searching a locally stored version of an abstract of the content provider, or the like.

In either case, content is obtained, either from the content provider server 440–460 or from a locally stored copy of the content from the content provider server 440–460. The personalized accessibility evaluation provider 420 then evaluates the obtained content to determine a level of accessibility for the content.

The level of accessibility may be defined, for example, as a level of accessibility for handicapped individuals or individuals having special accessibility needs. For example, the level of accessibility may be an organization of guidelines, such as those defined by the Web Accessibility Initiative (WAI) of the World Wide Web Consortium standards body, as described in the Web Content Accessibility Guidelines, Techniques for WCAG, available from www.w3c.org, and which are hereby incorporated by reference. Thus, for example, the accessibility levels may be one or more organizations of the following current WAI guidelines:

(1) Provide alternative text for all images;
(2) Provide alternative text for each APPLET;
(3) Provide alternative content for each OBJECT;
(4) Provide alternative text for all image-type buttons in forms;
(5) If the submit button is used as an image map, use separate buttons for each active region;
(6) ALT text >150 characters, consider providing a separate description;
(7) Have a descriptive (D) link in addition to LONGDESC;
(8) If an image conveys important information beyond what is in its alternative text, provide an extended description;
(9) All audio files have transcripts;
(10) ASCII art is avoided;
(11) Provide a synchronized textual transcript for the audio in videos;
(12) Provide text links for all server-side image map hotspots;
(13) Provide both a description and a synchronized caption for video information;
(14) Provide visual notification and transcripts of sounds that are played automatically;
(15) Avoid Client-side image map {0} that does not contain a link {1} elsewhere on the page;
(16) If a color is used to convey information, make sure the information is also represented another way;
(17) Foreground and background colors contrast sufficiently with each other;
(18) Where it's possible to mark up content (for example mathematical equations) instead of using images, use a markup language (such as MathML);
(19) Make sure the document validates to formal published grammars;
(20) Style sheets should be used to control layout and presentation wherever possible;
(21) Use relative sizing and positioning (% values) rather than absolute (pixels);
(22) Make sure that headings are nested properly;
(23) Use header elements in the proper sequence and not for bold text;
(24) Only use list elements for actual lists, not formatting;
(25) Use Q and BLOCKQUOTE for quotations, not indentation;
(26) Mark up quotations with the Q and BLOCKQUOTE elements;
(27) Identify any changes in the document's language;

(28) Use the ABBR and ACRONYM elements to denote and expand abbreviations and acronyms;
(29) Identify the language of the text;
(30) For tables not used for layout (for example, a spreadsheet), identify headers for the table rows and columns;
(31) If a table has two or more rows or columns that serve as headers, use structural markup to identify their hierarchy and relationship;
(32) Avoid using tables to format text documents in columns unless the table can be linearized;
(33) If a table is used for layout only, do not use structural markup to achieve formatting effects;
(34) Provide a summary and caption for tables;
(35) Provide abbreviations for long row or column labels;
(36) Be sure pages are readable and usable if style sheets are ignored;
(37) Ensure that descriptions of dynamic content are updated with changes in content;
(38) Each FRAME must reference an HTML file;
(39) Provide alternative content for each SCRIPT that conveys important information or functionality;
(40) Make sure pages are still usable if programmatic objects do not function;
(41) Make sure event handlers do not require use of a mouse;
(42) Provide a NOFRAMES section when using FRAMEs;
(43) Ensure that dynamic content is accessible or provides an alternate presentation or page;
(44) Make sure programmatic objects do not cause the screen to flicker;
(45) Avoid blinking text created with the BLINK element;
(46) Avoid scrolling text created with the MARQUEE element;
(47) Avoid using movement in images where possible;
(48) Do not cause a page to refresh automatically;
(49) Do not cause a page to redirect to a new URL;
(50) Provide accessible alternatives to the information in scripts, applets, or objects;
(51) Use a client-side image map instead of a server-side image map;
(52) Ensure that all elements that have their own interface are operable without a mouse;
(53) Specify a logical tab order among form controls, links and objects;
(54) Consider adding keyboard shortcuts to frequently used links;
(55) Consider furnishing keyboard shortcuts for form elements;
(56) Do not use pop-up windows or change the active window unless the user is aware this is happening;
(57) If scripts create pop-up windows or change the active window, ensure that the user is aware this is happening;
(58) Ensure that labels of all form controls are placed immediately before the control;
(59) Provided a linear text alternative for tables that lay out content in parallel, word-wrapped columns;
(60) Include default, place-holding characters in edit boxes and text areas;
(61) Separate adjacent links with more than whitespace;
(62) Use the latest technology specification available whenever possible;
(63) Avoid use of deprecated language features if possible;
(64) Allow users to customize their experience of the web page;
(65) If a page accessible cannot be made accessible, construct an alternate accessible version;
(66) Give each frame a title;
(67) Add a description to a frame if the TITLE does not describe its contents;
(68) Group long lists of selections into a hierarchy;
(69) Group related form controls and label each group;
(70) Group related elements when possible;
(71) Explicitly associate form controls and their labels with the LABEL element;
(72) Create link phrases that make sense when read out of context;
(73) Add a descriptive title to links when needed;
(74) Do not use the same link phrase more than once when the links point to different URLs;
(75) Use metadata to add computer-understandable information about the page;
(76) Offer a site map or table of contents, and provide a description of the general layout of the site, the access features used, and how to use them;
(77) Use a clear, consistent navigation structure;
(78) Offer navigation bars for easy access to the navigation structure;
(79) Group related links;
(80) Provide a link at the beginning of a group of related links to bypass the group;
(81) Offer different types of searches for different skill levels and preferences;
(82) Place distinguishing information at the beginning of headings, paragraphs, lists, etc.;
(83) Provide metadata that identifies this document's location in a collection;
(84) If ASCII art is present, provide a means to skip over it;
(85) Use the simplest and most straight-forward language that is possible;
(86) Use icons or graphics (with accessible alternatives) to facilitate comprehension of the page; and
(87) Create a consistent style of presentation between pages.

The mechanism for evaluating the accessibility level of the received content may be, for example, a device that analyzes the content for the occurrence, or lack thereof, of accessibility criteria generated based on, for example, the above accessibility guidelines. For example, the mechanism for evaluating the accessibility level may be the Bobby™ software available from CAST at www.cast.org/bobby/.

Bobby™ is a Web-based tool that analyzes Web pages for their accessibility to people with disabilities. CAST offers Bobby™ as a free public service. With the Bobby™ software, a user may enter a Uniform Resource Locator (URL) of a Web page that Bobby™ is to analyze. The Bobby™ software evaluates the Web page associated with the entered URL and generates a report indicating any accessibility and browser compatibility errors found in the Web page. Once a Web page meets accessibility requirements for at least one accessibility level, the Web page is allowed to display a Bobby™ approved symbol. Of course, other content evaluation devices, either now known or later developed, may be used without departing from the spirit and scope of the present invention.

Thus, the content received by the personalized accessibility evaluation provider 420 is evaluated using an evaluation tool to determine a level of accessibility. The evaluation may make use of a tool, such as Bobby™ to perform the evaluation of the received content. The result of the evaluation of the received content is an indicator of an accessibility level of the received content which is then compared to a required accessibility level identified in a user profile retrieved by the personalized accessibility evaluation provider 420 from a user profile database 430.

For example, a disabled user may register with the personalized accessibility evaluation provider 420 and establish a user profile which is stored in user profile database 430. The user profile may indicate that the user requires that content retrieved from content providers 440–460 must meet level 1 accessibility requirements before the content is provided to the user's client device 410. Level 1 accessibility may include, for example, accessibility criteria generated based on guidelines 1–20 set forth above; level 2 accessibility may include, for example, accessibility criteria generated based on guidelines 21–41 set forth above, and so on.

If after evaluation, the received content has an accessibility level that meets the user's requirements as set forth in the user profile, the received content is transmitted to the client device 410 as filtered content. In this way, only content that meets accessibility criteria set forth by the user will be provided to the user of the client device 410. Thus, the user is only provided with content that has been designed to be accessible by a person having the disability or special need of the user.

While FIG. 4 shows the personalized accessibility evaluation provider 420 and the user profile database 430 as being separate devices from the client device 410, the present invention is not limited to such an architecture. Rather, the personalized accessibility evaluation provider 420 and user profile database 430 may be resident on the client device 410 or one or more of the content provider servers 440–460. If on the client device 410, the personalized accessibility evaluation provider 420 may be implemented as a part of a Web browser application, a plug-in component of a Web browser application, or as a separate application on the client device 410. If on a content provider server 440–460, the personalized accessibility evaluation provider 420 may be a reverse proxy for the content provider server 440–460, for example.

Figure 5:
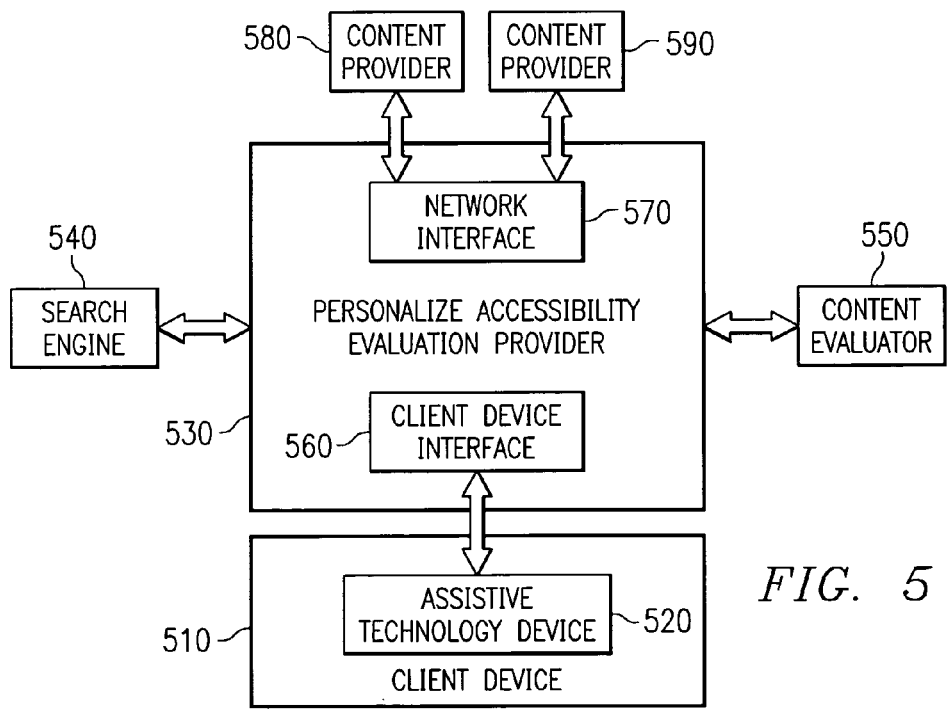
FIG. 5 is an exemplary block diagram illustrating an interaction of components of the elements shown in FIG. 4.

FIG. 5 is an exemplary block diagram illustrating the primary operating components of the client device and personalized accessibility evaluation provider according to the present invention. The operation of the present invention will be described with reference to FIG. 5 when processing search results from a search engine. It should be appreciated that the present invention is not limited to application to search results from a search engine but is applicable to evaluation and filtering of any requested content, whether by means of a search engine or other tool for the retrieval of requested content.

As shown in FIG. 5, the client device 510 contains an assistive technology device 520 that is used to communicate with the personalized accessibility evaluation provider 530. The assistive technology device 520 may be, for example, a part of a browser application, a plug-in component to a browser application, or a separate application or device resident on the client device 510 that is used to direct content requests to the personalized accessibility evaluation provider 530. For example, a user of the client device 510 may enter a search request into a search engine 540, such as Yahoo™, associated with the personalized accessibility evaluation provider 530. The entry from the client device 510 is directed by the assistive technology device 520 to the client device interface 560 of the personalized accessibility evaluation provider 530. The personalized accessibility evaluation provider 530 receives the input and forwards it to the search engine 540.

The search engine 540 either searches a local storage of content provider abstracts, or broadcasts a search request to content providers 580–590, and identifies content providers that provide the requested content in the search request. The results of the search are supplied to the personalized accessibility evaluation provider 530.

The personalized accessibility evaluation provider 530 then supplies the results of the search, such as the content itself or the URLs for the search result entries, to the content evaluator 550. The content evaluator 550 evaluates the search results for conformance with established accessibility criteria and returns a result of the accessibility level of the entries of the search results.

The personalized accessibility evaluation provider 530 then compares the accessibility level of the entries of the search results to accessibility level requirements set forth in a retrieved user profile for the user of the client device 510. The retrieval of the user profile from the user profile database 565 may occur when the client device submits the search request, while search results are being compiled, while the search results are being evaluated, after the results of the evaluation are returned, or any other time during the above process.

Based on the comparison of the search results to the accessibility level requirements of the user profile, certain ones of the entries in the search results will be removed from the search results and others will be maintained based on whether or not the entries satisfy the accessibility level requirements. Only those entries that satisfy the accessibility level requirements are maintained in the search results. Alternatively, all of the entries may be maintained in the search results with those that do not meet the accessibility requirements being appended to include an indicator that the entry does not meet the required accessibility level. The filtered search results are then provided to the client device via the client device interface 560 and assistive technology device 520.

Figure 6:
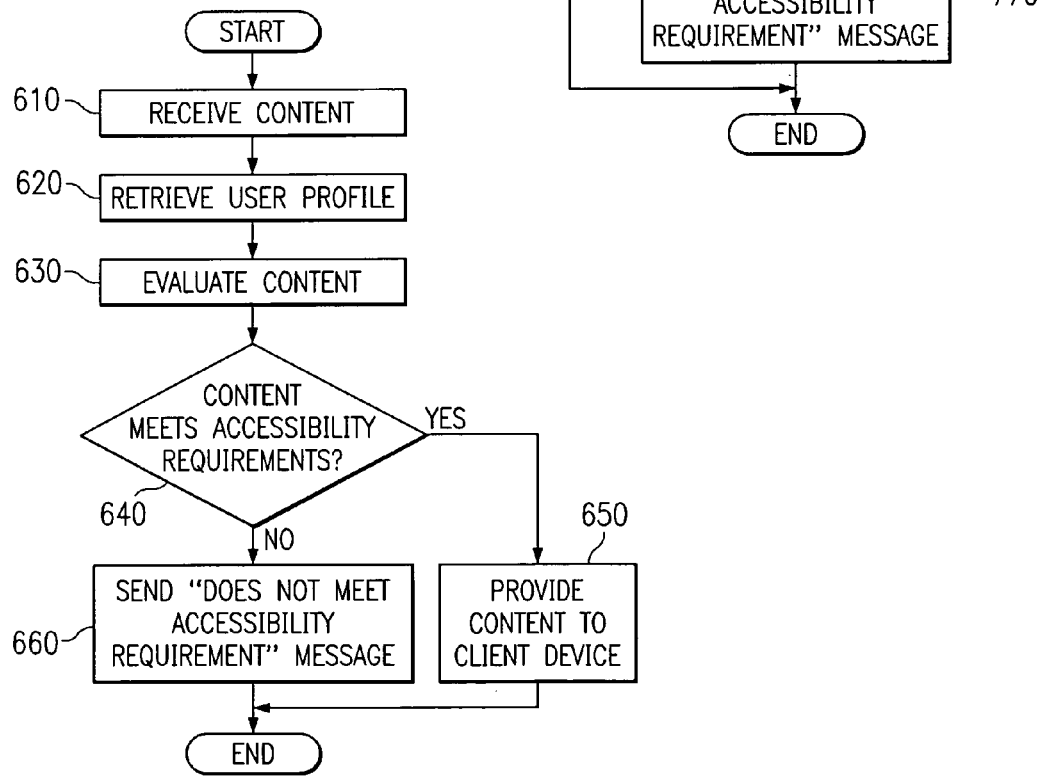
FIG. 6 is a flowchart outlining an exemplary operation of the present invention.

FIG. 6 is a flowchart outlining an exemplary operation of the present invention. FIG. 6 describes the evaluation of content for accessibility level. The content itself may be received through a number of different means including by way of a search engine, by direct request for the content from a client device, or the like. The operation outlined in FIG. 6 is not dependent or limited by the manner in which the content is requested.

As shown in FIG. 6, the operation starts with content being received (step 610). The content may be received in response to a request entered by a user via, for example, a web browser application of a client device, a search engine, or the like. The user profile for the user is retrieved (step 620) and the content is evaluated for accessibility level (step 630).

A determination is made as to whether the content meets the accessibility requirements set forth in the user profile (step 640). This determination may be made by comparing the results of the evaluation of the content for accessibility level with the accessibility requirements set forth in the user profile, for example. If the content meets the accessibility requirements, the content is provided to the client device (step 650). If the content does not meet the accessibility requirements, a "Does not meet Accessibility Requirement" message may be returned to the client device (step 660). The operation then ends.

Thus, the present invention provides a mechanism by which requested content may be filtered based on whether or not the requested content meets accessibility requirements of a user. The present invention makes use of a content evaluator, such as Bobby™, to evaluate and identify an accessibility level of the requested content.

The accessibility level is then compared to accessibility requirements designated by a user, such as through a user profile. If the accessibility level meets the accessibility requirements, the content is provided to the user, otherwise the content is either not provided or an indication that the content does not meet accessibility requirements is appended to the content.

The above embodiments of the present invention illustrate the basic functionality of the invention. As described above, if content is determined to not meet accessibility requirements of a user, the content is either not provided to the user or an indicator of the inaccessibility is appended to the content. In a further embodiment of the present invention, if the content is inaccessible to the user, the content may be modified to make the content accessible.

For example, if content, such as a HTML Web page, is requested and determined to be inaccessible to the user, parameters in the HTML Web page may be adjusted to correspond to the accessibility criteria to make the HTML Web page meet the accessibility requirements of the user. That is, the values for various HTML tags may be modified to values that are designated by the accessibility criteria.

As an example, during the evaluation of the HTML Web page, the various elements of the HTML Web page that do not meet the accessibility criteria may be logged. After the initial evaluation, the personalized accessibility evaluation provider may examine the log of elements not meeting the accessibility criteria and modify values of associated HTML tags to place these elements into conformance with the accessibility criteria. For example, display colors may be reset to provide greater contrast between background and foreground, ASCII art may be deleted, indentations for quotations may be replaced with Q and BLOCKQUOTE, and the like.

The particular modifications made may be based on values determined using a rule set, an algorithm, or the like. For example, a rule set may designate that if a background color is purple, the foreground color should be set to yellow. Similarly, the rule set may state that ASCII art is to be deleted and that double indentations are to be replaced with Q and BLOCKQUOTE.

Once necessary modifications are made, the modified content may be resubmitted to the evaluation tool for reevaluation. The result should be that the modified content is now accessible to the user and thus, the modified content is then provided to the client device. In this way, content that may otherwise be inaccessible to a user, may be made accessible.

Figure 7:
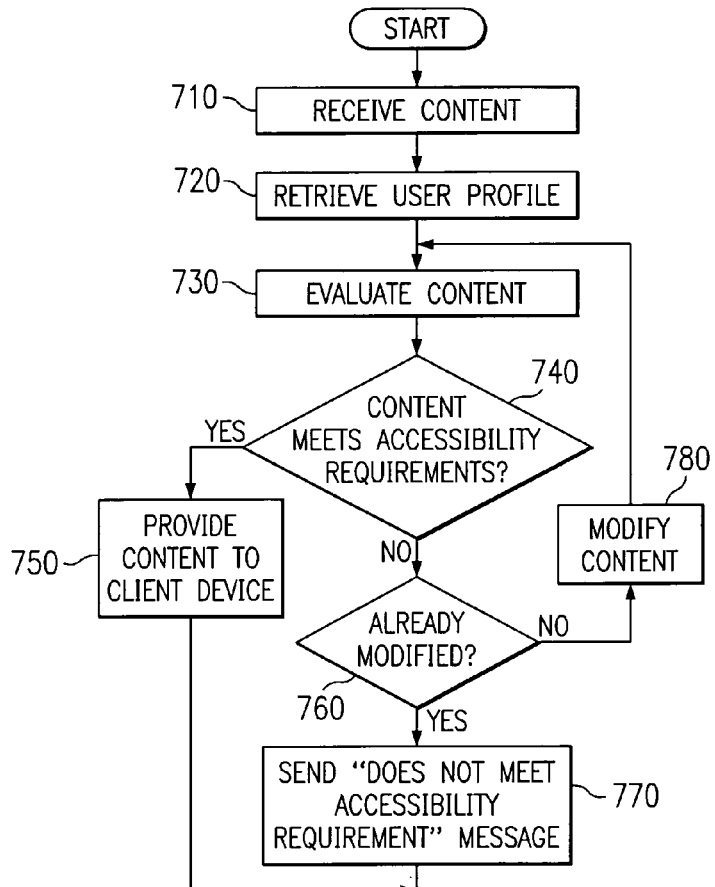
FIG. 7 is a flowchart outlining an exemplary operation of the present invention according to an alternative embodiment.

FIG. 7 is a flowchart outlining an exemplary operation of the present invention according to this alternative embodiment. As shown in FIG. 7, the steps 710–750 are similar to steps 610–650 in FIG. 6 and thus, a detailed explanation of these steps will not be repeated. If the content is determined in step 740 to not meet accessibility requirements, a determination is made as to whether the content has already been modified (step 760). If so, a "Does not meet accessibility requirement" message is provided to the client (step 770). If the content has not already been modified, an attempt is made to modify the content to meet the accessibility requirements (step 780). The results of the modification are then reevaluated at step 730 and the process designated by steps 740–760. If the modified content meets the accessibility requirements in step 740, the modified content is provided to the client in step 750. Otherwise, if the modified content still does not meet the accessibility requirements, the "Does not meet accessibility requirements" message will be sent to the client in step 770 since the content has already been modified.

Thus, in this alternative embodiment, the present invention provides a mechanism by which inaccessible content may be made accessible to a disabled user. The content may be modified in view of its shortcomings, as determined from the initial evaluation of the content, in order to make the content meet accessibility requirements designated by the user. In this way, the amount of content available to the user is increased.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of providing content to a client, comprising:
retrieving the content, wherein retrieving the content includes performing a search of content providers;
performing an evaluation of the content for accessibility by a user, wherein performing an evaluation of the content for accessibility by a user includes determining an accessibility level of the content based on accessibility criteria that is determined by analyzing how the content will be presented by the client;
determining whether the determined accessibility level of the content meets an accessibility requirement for the user;
providing the content to the client if the determined accessibility level of the content meets the accessibility requirement for the user; and
providing an indication to the client that the content does not meet accessibility requirements if the determined accessibility level of the content does not meet the accessibility requirement for the user.

2. The method of claim 1, wherein the accessibility criteria are established based on standardized handicap accessibility guidelines.

3. The method of claim 1, wherein performing an evaluation of the content for accessibility by a user includes using an evaluation tool to perform the evaluation.

4. The method of claim 1, wherein the accessibility requirement for the user is obtained from a user profile.

5. The method of claim 1, wherein the method is implemented on the client.

6. The method of claim 1, wherein the content is at least one Web page.

7. The method of claim 1, further comprising modifying the content such that the content meets the accessibility requirement for the user.

8. The method of claim 1, wherein the accessibility requirement for the user is maintained in a user profile for the user.

9. A method of providing content to a client, comprising:
retrieving the content;
performing an evaluation of the retrieved content for accessibility by a user by determining how the retrieved content will be presented to the user; and
providing the retrieved content to the client if a result of the evaluation meets a particular accessibility requirement for the user that is maintained in a user profile for the user, wherein the method is implemented on a proxy server and wherein the proxy server provides the retrieved content to the client in its original form as retrieved without subsequent modification and the retrieved content is presented to the user in its original form as specified by the content as retrieved.

10. A method of providing content to a user, comprising:
retrieving the content;
performing an evaluation of the retrieved content for accessibility by the user by determining how the retrieved content will be presented to the user;
providing the retrieved content to the user if a result of the evaluation meets a particular accessibility requirement for the user that is maintained in a user profile for the user; and
if the result of the evaluation does not meet the accessibility requirement for the user, modifying the retrieved content such that the retrieved content meets the accessibility requirement for the user, wherein modifying the retrieved content includes changing values for presentation tags in the retrieved content based on one of a rule set and an algorithm such that the retrieved content, when presented to the user, meets the accessibility requirement for the user, wherein the presentation tags describe how particular content is to be presented.

11. A method of providing content to a user, comprising:
retrieving the content;
performing an evaluation of the retrieved content for accessibility by the user by determining how the retrieved content will be presented to the user;
providing the retrieved content to the user if a result of the evaluation meets an accessibility requirement for the user; and
if the result of the evaluation does not meet the accessibility requirement for the user, modifying the retrieved content such that the retrieved content meets the accessibility requirement for the user, wherein performing the evaluation of the retrieved content for accessibility by the user includes logging elements of the retrieved content that do not meet accessibility criteria, and wherein modifying the retrieved content includes modifying logged elements and then re-evaluating the retrieved content to confirm the accessibility requirement for the user has been met by such retrieved content modification.

12. The method of claim 11, wherein the accessibility requirement for the user is maintained in a user profile for the user.

13. An apparatus of providing content to a client, comprising:
means for retrieving the content, wherein the means for retrieving the content includes means for performing a search of content providers, wherein the means for performing an evaluation of the content for accessibility by a user includes means for determining an accessibility level of the content based on accessibility criteria that is determined by analyzing how the content will be presented by the client;
means for performing an evaluation of the content for accessibility by a user;
means for determining whether the determined accessibility level of the content meets an accessibility requirement for the user;
means for providing the content to the client if the determined accessibility level of the content meets the accessibility requirement for the user; and
means for providing an indication to the client that the content does not meet accessibility requirements if the result of the evaluation is that the content does not meet the accessibility requirement for the user.

14. The apparatus of claim 13, wherein the accessibility criteria are established based on standardized handicap accessibility guidelines.

15. The apparatus of claim 13, wherein the means for performing an evaluation of the content for accessibility by a user includes means for using an evaluation tool to perform the evaluation.

16. The apparatus of claim 13, wherein the accessibility requirement for the user is obtained from a user profile.

17. The apparatus of claim 13, wherein the apparatus is associated with the client.

18. The apparatus of claim 13, wherein the content is at least one Web page.

19. The apparatus of claim 13, further comprising means for modifying the content such that the content meets the accessibility requirement for the user.

20. An apparatus of providing content to a client, comprising
means for retrieving the content, wherein the means for retrieving the content includes means for performing a search of content providers;
means for performing an evaluation of the retrieved content for accessibility by a user by determining how the retrieved content will be presented to the user; and
means for providing the retrieved content to the client if a result of the evaluation meets a particular accessibility requirement for the user that is maintained in a user profile for the user, wherein the apparatus is associated with a proxy server and wherein the apparatus provides the retrieved content to the client in its original form as retrieved without subsequent modification and the retrieved content is presented to the user in its original form as specified by the content as retrieved.

21. An apparatus of providing content to a user, comprising:
means for retrieving the content;
means for performing an evaluation of the retrieved content for accessibility by the user by determining how the retrieved content will be presented to the user;
means for providing the retrieved content to the user if a result of the evaluation meets a particular accessibility requirement for the user that is maintained in a user profile for the user; and
means for modifying the retrieved content if the result of the evaluation does not meet the accessibility requirement for the user such that the retrieved content meets the accessibility requirement for the user, wherein the means for modifying the retrieved content includes means for changing values for presentation tags in the retrieved content based on one of a rule set and an algorithm such that the retrieved content, when presented to the user, meets the accessibility requirement for the user, wherein the presentation tags describe how particular content is to be presented.

22. An apparatus of providing content to a user, comprising:
means for retrieving the content;
means for performing an evaluation of the retrieved content for accessibility by the user by determining how the retrieved content will be presented to the user;
means for providing the retrieved content to the user if a result of the evaluation meets an accessibility requirement for the user; and
means for modifying the retrieved content if the result of the evaluation does not meet the accessibility requirement for the user such that the retrieved content meets the accessibility requirement for the user, wherein the means for performing the evaluation of the retrieved content for accessibility by the user includes means for logging elements of the retrieved content that do not meet accessibility criteria, and wherein the means for modifying the retrieved content includes means for modifying logged elements and then re-evaluating the retrieved content to confirm the accessibility requirement for the user has been met by such retrieved content modification.

23. A computer program product in a computer readable medium for providing content to a client, comprising:
    first instructions for retrieving the content, wherein the first instructions include instructions for performing a search of content providers;
    second instructions for performing an evaluation of the content for accessibility by a user, wherein the second instructions include instructions for determining an accessibility level of the content based on accessibility criteria that is determined by analyzing how the content will be presented by the client;
    third instructions for determining whether the determined accessibility level of the content meets an accessibility requirement for the user;
    fourth instructions for providing the content to the client if the determined accessibility level of the content meets the accessibility requirement for the user; and
    fifth instructions for providing an indication to the client that the content does not meet accessibility requirements if a result of the second instructions is that the content does not meet the accessibility requirement for the user.

24. The computer program product of claim 23, wherein the accessibility criteria are established based on standardized handicap accessibility guidelines.

25. The computer program product of claim 23, wherein the second instructions include instructions for using an evaluation tool to perform the evaluation.

26. The computer program product of claim 23, wherein the accessibility requirement for the user is obtained from a user profile.

27. The computer program product of claim 23, wherein the computer program product is executed on the client.

28. The computer program product of claim 23, wherein the content is at least one Web page.

29. The computer program product of claim 23, further comprising fourth instructions for modifying the content such that the content meets the accessibility requirement for the user.

30. A computer program product in a computer readable medium for providing content to a client, comprising:
    first instructions for retrieving the content;
    second instructions for performing an evaluation of the retrieved content for accessibility by a user by determining how the retrieved content will be presented to the user; and
    third instructions for providing the retrieved content to the client if a result of the evaluation meets a particular accessibility requirement for the user that is maintained in a user profile for the user, wherein the computer program product is executed on a proxy server and wherein the computer program product provides the retrieved content to the client in its original form as retrieved without subsequent modification and the retrieved content is presented to the user in its original form as specified by the content as retrieved.

31. A computer program product in a computer readable medium for providing content to a user, comprising:
    first instructions for retrieving the content;
    second instructions for performing an evaluation of the retrieved content for accessibility by the user by determining how the retrieved content will be presented to the user;
    third instructions for providing the retrieved content to the user if a result of the evaluation meets a particular accessibility requirement for the user that is maintained in a user profile for the user; and
    fourth instructions for modifying the retrieved content if the result of the evaluation does not meet the accessibility requirement for the user such that the retrieved content meets the accessibility requirement for the user, wherein the fourth instructions include instructions for changing values for presentation tags in the retrieved content based on one of a rule set and an algorithm such that the retrieved content, when presented to the user, meets the accessibility requirement for the user, wherein the presentation tags describe how particular content is to be presented.

32. A computer program product in a computer readable medium for providing content to a user, comprising:
    first instructions for retrieving the content;
    second instructions for performing an evaluation of the retrieved content for accessibility by the user by determining how the retrieved content will be presented to the user;
    third instructions for providing the retrieved content to the user if a result of the evaluation meets an accessibility requirement for the user; and
    fourth instructions for modifying the retrieved content if the result of the evaluation does not meet the accessibility requirement for the user such that the retrieved content meets the accessibility requirement for the user, wherein the second instructions include instructions for logging elements of the retrieved content that do not meet accessibility criteria, and wherein the fourth instructions include instructions for modifying logged elements and then re-evaluating the retrieved content to confirm the accessibility requirement for the user has been met by such retrieved content modification.

33. A proxy server on a network that facilitates communication between a search engine and a user, comprising:
    means for receiving, by the proxy server, a search request from the user;
    means for forwarding, by the proxy server, the search request to the search engine;
    means for receiving, by the proxy server, search results of the search request from the search engine;
    means for performing, by the proxy server, an evaluation of content pertaining to the search results for accessibility by the user by analyzing how the content is specified to be presented to the user;
    means for providing, by the proxy server, the content to the user if a result of the evaluation meets an accessibility requirement for the user; and
    means for modifying, by the proxy server, the content if the result of the evaluation does not meet the accessibility requirement for the user such that the content meets the accessibility requirement for the user.

34. The proxy server of claim 33, wherein the means for modifying the content comprises means for changing values for presentation tags in the content based on one of a rule set and an algorithm such that the content, when presented to the user, meets the accessibility requirement for the user, wherein the presentation tags describe how particular portions of the content are to be presented.

* * * * *